(12) United States Patent
Pulak et al.

(10) Patent No.: US 8,255,274 B2
(45) Date of Patent: Aug. 28, 2012

(54) INTEGRATED QUALIFICATION AND MONITORING FOR CUSTOMER PROMOTIONS

(75) Inventors: Mohammad Pulak, Richardson, TX (US); Sayeed Mahmud, Carrollton, TX (US); Yankai Su, Irving, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 149 days.

(21) Appl. No.: 12/723,793

(22) Filed: Mar. 15, 2010

(65) Prior Publication Data

US 2011/0225030 A1    Sep. 15, 2011

(51) Int. Cl.
*G06Q 30/00* (2006.01)

(52) U.S. Cl. ............... 705/14.25; 705/14.53; 705/14.66; 705/14.49; 705/14.54

(58) Field of Classification Search .................... 705/14, 705/14.25, 14.66, 14.49, 14.54, 14.53
See application file for complete search history.

(56) References Cited

U.S. PATENT DOCUMENTS

| | | | | |
|---|---|---|---|---|
| 6,134,532 A * | 10/2000 | Lazarus et al. | ............ | 705/14.25 |
| 6,954,732 B1 * | 10/2005 | DeLapa et al. | ............ | 705/14.35 |
| 2002/0123928 A1 * | 9/2002 | Eldering et al. | ................ | 705/14 |
| 2004/0140361 A1 * | 7/2004 | Paul et al. | ................ | 235/462.45 |
| 2004/0267611 A1 * | 12/2004 | Hoerenz | ........................ | 705/14 |
| 2007/0162341 A1 * | 7/2007 | McConnell et al. | ............ | 705/14 |
| 2007/0174259 A1 * | 7/2007 | Amjadi | ............. | 707/3 |
| 2007/0192183 A1 * | 8/2007 | Monaco et al. | ................ | 705/14 |
| 2008/0097851 A1 * | 4/2008 | Bemmel et al. | ................ | 705/14 |
| 2008/0154757 A1 * | 6/2008 | Barros et al. | .................... | 705/35 |
| 2009/0076912 A1 * | 3/2009 | Rajan et al. | .................... | 705/14 |
| 2009/0163183 A1 * | 6/2009 | O'Donoghue et al. | ..... | 455/414.1 |
| 2009/0234745 A1 * | 9/2009 | Ramer et al. | ............... | 705/14.23 |
| 2010/0088149 A1 * | 4/2010 | Sullivan et al. | ................. | 705/10 |

FOREIGN PATENT DOCUMENTS

WO    WO 2006/045060 A2 *    4/2006

* cited by examiner

*Primary Examiner* — Michael Bekerman
*Assistant Examiner* — Luis Brown

(57) ABSTRACT

A device receives, from a user device, a request for qualified offers for a particular customer, and retrieves, based on the request, profile information associated with the particular customer. The device generates a call to a backend database based on the profile information, and receives, from the backend database, offer qualification indicators based on the call. The device determines qualified offers based on the offer qualification indicators, and provides the qualified offers to the user device for display.

16 Claims, 14 Drawing Sheets

INTEGRATED QUALIFICATION AND MONITORING FOR CUSTOMER PROMOTIONS

BACKGROUND

Currently, a customer service representative (e.g., for telecommunications providers, cable television providers, Internet service providers, etc.) may determine whether a particular customer qualifies for promotions (e.g., offers for services, products, etc.) based on customer information. For example, a telecommunication provider representative may access information associated with a customer based on the customer's telephone number. The customer information may then be used to match current offers (e.g., provided by the telecommunication provider) with the customer, and the representative may provide the current offers to the customer (e.g., via a telephone call).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide integrated qualification and monitoring for customer promotions. The systems and/or methods may determine whether a customer is qualified for promotions (e.g., offers for products and/or services) based on qualification criteria information retrieved from customer profile information (e.g., retrieved from frontend devices in real time) and/or retrieved from backend devices. The systems and/or methods may strengthen and/or supplement an offer qualification process, may distribute loads associated with the offer qualification process, may require a minimum amount of code changes, and/or may be applied to various types of qualification projects.

In one implementation, for example, the systems and/or methods may receive, from a user of a user device, a request for qualified offers (e.g., for a product or service) for a particular customer, and may retrieve, based on the request and in real time, profile information associated with the customer. The systems and/or methods may generate a call to a backend database(s) based on the profile information, and may receive, from the backend database(s), offer qualification indicators based on the call. The systems and/or methods may determine qualified offers based on the offer qualification indicators, and may provide the determined qualified offers for display to the user device. The systems and/or methods may monitor the qualified offers to determine one or more ineligible offers for the customer, and may retract the ineligible offer(s) from the qualified offers.

As used herein, the term "user" is intended to be broadly interpreted to include a user device or a user of a user device. A "product," as the term is used herein, is to be broadly interpreted to include anything that may be marketed or sold as a commodity or a good. For example, a product may include a telephone, a modem, a set-top box, etc. A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), etc.

Figure 1:
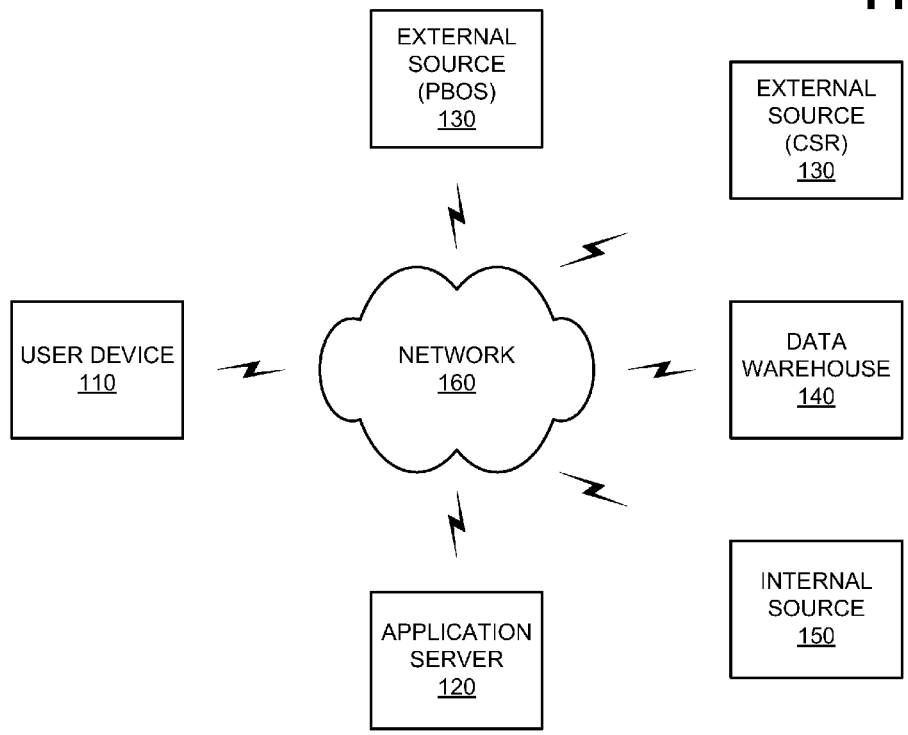
FIG. 1 is a diagram of an exemplary network in which systems and/or methods described herein may be implemented.

FIG. 1 is a diagram of an exemplary network 100 in which systems and/or methods described herein may be implemented. As illustrated, network 100 may include a user device 110, an application server 120, external sources 130, a data warehouse 140, and an internal source 150 interconnected by a network 160. Components of network 100 may interconnect via wired and/or wireless connections. Two external sources 130 and a single user device 110, application server 120, data warehouse 140, internal source 150, and network 160 have been illustrated in FIG. 1 for simplicity. In practice, there may be more user devices 110, application servers 120, external sources 130, data warehouses 140, internal sources 150, and/or networks 160. Also, in some instances, one or more of the components of network 100 may perform one or more functions described as being performed by another one or more of the components of network 100.

User device 110 may include any device that is capable of accessing application server 120 via network 160. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, a laptop computer, a personal computer, or other types of computation or communication devices.

Application server 120 may include one or more server devices, or other types of computation or communication devices, that gather, process, search, and/or provide information in a manner described herein. In one exemplary implementation, application server 120 may receive, from user device 110, a request for offers for which a particular customer may be qualified, and may retrieve, based on the request and in real time, profile information associated with the customer. Application server 120 may generate a call to data warehouse 140/internal source 150 based on the profile information, and may receive, from data warehouse 140/internal source 150, offer qualification indicators based on the call. Application server 120 may determine qualified offers based on the offer qualification indicators, and may provide the determined qualified offers for display to user device 110. Application server 120 may monitor the qualified offers to determine one or more ineligible offers for the customer, and may retract the ineligible offer(s) from the qualified offers.

Each of external sources 130 may include one or more server devices, or other types of computation or communication devices, that gather, process, search, and/or provide information in a manner described herein. In one exemplary implementation, one of external sources 130 may include a device that provides a Public Switched Telephone Network (PSTN) broadband ordering system (PBOS). In another exemplary implementation, one of external sources 130 may include a server device that includes customer service records (CSRs). In one example, external sources 130 may include profile information associated with customers (e.g., telecommunication customers), and application server 120 may retrieve the profile information from external sources 130. External sources 130 may be referred to herein as "frontend devices" or the "frontend."

Data warehouse 140 may include one or more server devices, or other types of computation or communication devices, that gather, process, search, and/or provide information in a manner described herein. In one exemplary implementation, data warehouse 140 may include a device that stores one or more databases associated with promotions, offers, etc. for one or more products and/or services.

Internal source 150 may include one or more server devices, or other types of computation or communication devices, that gather, process, search, and/or provide information in a manner described herein. In one exemplary implementation, internal source 150 may include a component (e.g., internal to application server 120) that stores databases associated with promotions, offers, etc. for one or more products and/or services.

In one exemplary implementation, data warehouse 140 and/or internal source 150 may receive, from application server 120, a request for information associated with qualified offers for a particular customer, and may generate offer eligibility conditions (e.g., for the customer) based on the request. Data warehouse 140/internal source 150 may retrieve (e.g., from external sources 130) attribute values associated with offers (e.g., based on the offer eligibility conditions), and may generate offer qualification indicators based on the attribute values. Data warehouse 140/internal source 150 may retrieve (e.g., from external sources 130) modified offer qualification indicators based on the offer qualification indicators, and may provide the modified offer qualification indicators to application server 120. Data warehouse 140 and/or internal source 150 may be referred to herein as "backend devices" or the "backend."

Network 160 may include a local area network (LAN), a wide area network (WAN), a metropolitan area network (MAN), a telephone network, such as the PSTN, a cellular network, a Wi-Fi network, an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Figure 2:
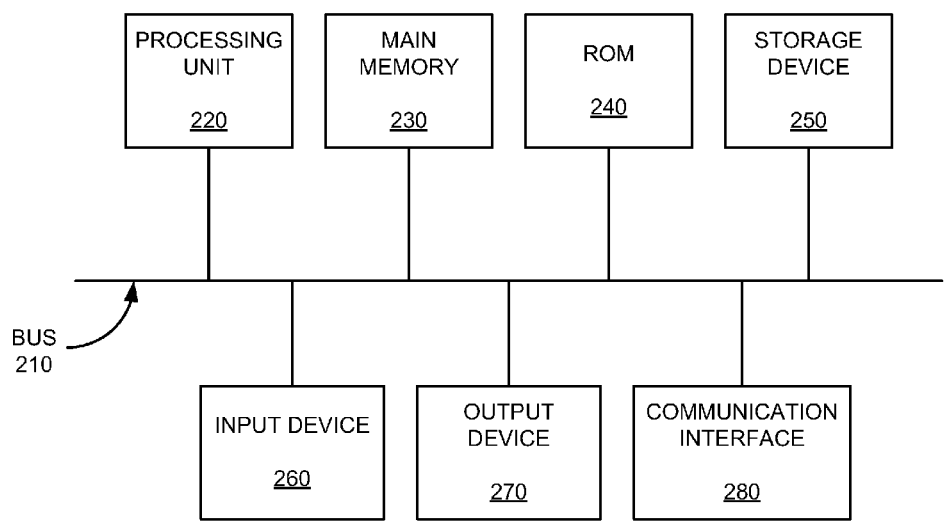
FIG. 2 is a diagram of exemplary components of one of the devices depicted in FIG. 1.

FIG. 2 illustrates a diagram of exemplary components of a device 200 that may correspond to one of the devices of network 100 (FIG. 1). As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
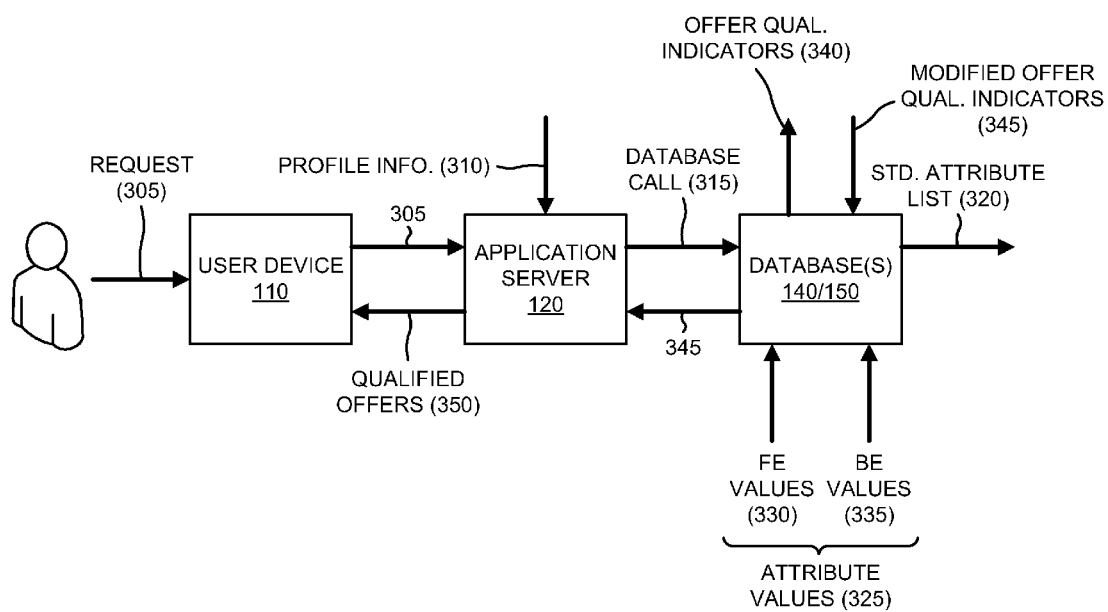
FIG. 3 is a diagram of exemplary operations capable of being performed by an exemplary portion of the network depicted in FIG. 1.

FIG. 3 is a diagram of exemplary operations capable of being performed by an exemplary portion 300 of network 100. As shown, network portion 300 may include user device 110, application server 120, external sources 130, and databases 140/150 (e.g., data warehouse 140 and internal source 150). User device 110, application server 120, external sources 130, and databases 140/150 may include the features described above in connection with FIGS. 1 and/or 2.

As further shown in FIG. 3, a user (e.g., a customer service representative) may provide a request 305 to user device 110.

Request 305 may include a request for qualified offers (e.g., for products and/or services) for a particular customer. For example, request 305 may involve the user inputting a telephone number associated with the particular customer into user device 110, and searching for qualified offers for the customer associated with the telephone number. User device 110 may provide request 305 to application server 120, and application server 120 may receive request 305. Application server 120 (e.g., based on request 305) may retrieve profile information 310 (e.g., from external sources 130) associated with the customer identified by request 305. Profile information 310 may include a variety of information associated with the customer, such as demographic information associated with the customer, current products owned by the customer, current services subscribed to by the customer, etc.

Application server 120 (e.g., based on profile information 310) may invoke a database call 315 to databases 140/150. Database call 315 may include a request for information associated with offers (e.g., for products and/or services) that may be applicable to the customer based on profile information 310. Databases 140/150 may receive database call 315 and may generate a standard attribute list 320 based on database call 315. Standard attribute list 320 may include offer eligibility conditions (e.g., conditions defining for which offers the customer may be eligible) associated with the particular customer. Databases 140/150 may provide standard attribute list 320 to the frontend (e.g., to external sources 130) in order to retrieve attribute values 325 from the frontend (FE). Attribute values 325 may include information that databases 140/150 may need for standard attribute list 320. For example, the frontend may receive standard attribute list 320 and may create an attribute string with customer values for the standard attributes provided in list 320. The frontend may provide the attribute string (e.g., with the customer values) to databases 140/150 as FE values 330. Databases 140/150 may use standard attribute list 320 (e.g., and/or FE values 330) to search (e.g., tables provided in databases 140/150) for customer values for the standard attributes provided in list 320. Databases 140/150 may retrieve such customer values as backend (BE) values 335. Thus, databases 140/150 may have two sets of values—one set received from the frontend as FE values 330 and one set retrieved from the backend as BE values 335. Examples of attribute values 325 are provided below in connection with FIGS. 4A-4D and 7.

Databases 140/150 may not perform an actual qualification process. However, databases 140/150 may prepare offer qualification indicators 340 based on FE values 330 and BE values 335. Offer qualification indicators 340 may include indicators of offers (e.g., a broadband service, a national bundle offer, etc.) for which the customer may qualify, flags indicating whether the offer information was obtained from the frontend or the backend, etc. Databases 140/150 may provide offer qualification indicators 340 to the frontend (e.g., to external sources 130). The frontend may receive offer qualification indicators 340, may call on other external services (e.g., if required), and may retrieve additional information for offer qualification indicators 340. For example, the frontend (e.g., external sources 130) may retrieve additional information not available in external sources 130 and databases 140/150, and may add the additional information to offer qualification indicators 340.

The frontend may provide multiple configurations for offer qualification indicators 340, such as a configuration that includes only offer qualification indicators 340 obtained from the frontend, a configuration that includes only offer qualification indicators 340 obtained from the backend, a configuration that includes offer qualification indicators 340 (e.g., obtained from the frontend) listed before offer qualification indicators 340 (e.g., obtained from the backend), etc. For example, if a qualification is to be performed with only FE values 330, the frontend may remove offer qualification indicators 340 obtained from the backend. The frontend may select one of the configurations, and may provide the selected configuration (e.g., as modified offer quality indicators 345) to databases 140/150. In one exemplary implementation, modified offer quality indicators 345 may be presented as a matrix that includes offers for the particular customer and scores associated with the offers. Databases 140/150 may provide modified offer qualification indicators 345 to application server 120, and application server 120 may receive modified offer qualification indicators 345.

Application server 120 may perform a qualification of the offers provided in modified offer qualification indicators 345, and may determine qualified offers 350 based on the qualification. Qualified offers 350 may include offers (e.g., for products and/or services) for which the particular customer qualifies. Application server 120 may provide qualified offers 350 to user device 110, and user device 110 may display qualified offers 350 to the user (e.g., the customer service representative).

Although FIG. 3 shows exemplary components of network portion 300, in other implementations, network portion 300 may contain fewer components, different components, differently arranged components, or additional components than depicted in FIG. 3. Alternatively, or additionally, one or more components of network portion 300 may perform one or more other tasks described as being performed by one or more other components of network portion 300.

FIGS. 4A-4D are diagrams of exemplary operations 400 capable of being performed by one or more of the devices of network 100. In one example, one or more of operations 400 may correspond to one or more of the operations described above in connection with FIG. 3.

Figure 4A:
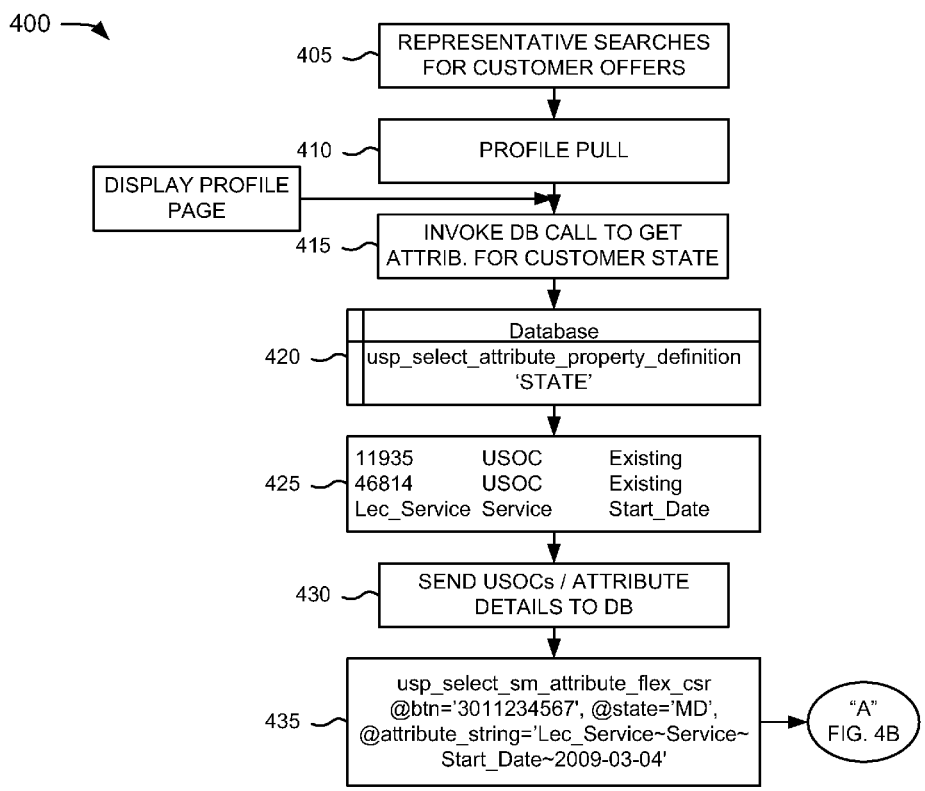
FIGS. 4A-4D are diagrams of exemplary operations capable of being performed by one or more of the devices of the network depicted in FIG. 1.

As shown in FIG. 4A, exemplary operations 400 may include a representative searching for offers for a customer associated with on a telephone number (block 405), and pulling a profile for the customer associated with the telephone number (block 410). For example, in implementations described above in connection with FIG. 3, a user (e.g., a customer service representative) may provide request 305 to user device 110. Request 305 may involve the user inputting a telephone number associated with the particular customer into user device 110, and searching for qualified offers for the customer associated with the telephone number. User device 110 may provide request 305 to application server 120, and application server 120 (e.g., based on request 305) may retrieve profile information 310 (e.g., from external sources 130) associated with the customer identified by request 305.

As further shown in FIG. 4A, the customer's profile page may be displayed to the representative, and a database call may be invoked in order to obtain attributes for the customer's geographic state (block 415). For example, in implementations described above in connection with FIG. 3, application server 120 (e.g., based on profile information 310) may invoke database call 315 to databases 140/150. Database call 315 may include a request for information associated with offers (e.g., for products and/or services) that may be applicable to the customer based on profile information 310.

In one implementation, the database call may include a search string (e.g., "usp_select_attribute_property_definition 'STATE'") (block 420) that is used to retrieve attributes (block 425) associated with the customer. For example, as shown in FIG. 4A, the attributes associated with the customer may include Universal Service Order Codes (USOCs) (e.g., "11935" and "46814") that define various network components, interfaces, products, and/or services associated with the customer. The attributes associated with the customer (block 425) may correspond to attribute values 325 described above in connection with FIG. 3.

Operations 400 may also include sending the USOCs and other attribute details (e.g., the attributes associated with the customer) to databases 140/150 for standardization (block 430). Databases 140/150 may standardize the attributes based on a text string (block 435). As shown in FIG. 4A, the text string may include information associated with the customer's telephone number (e.g., "3011234567"), the customer's state (e.g., "MD"), the customer's start date for a local exchange carrier (LEC) service, etc.

Figure 4B:
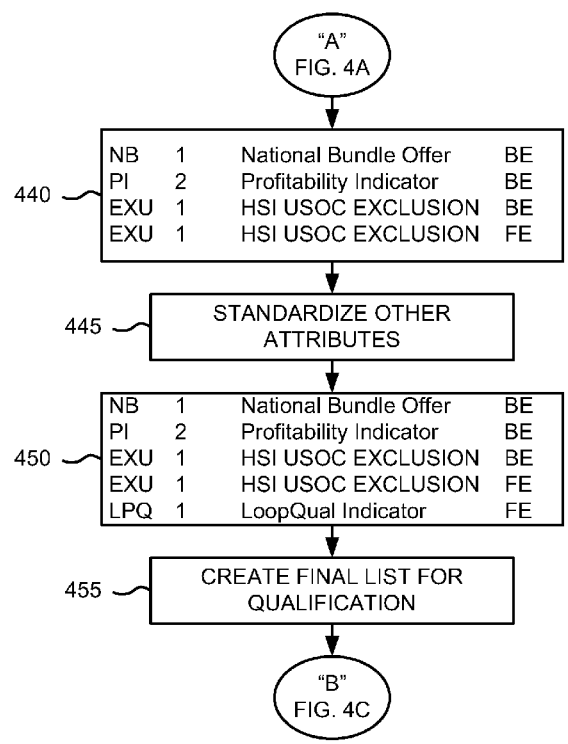

The standardized attributes (e.g., as standardized by databases 140/150 based on the text string) may include the information provided in block 440, as shown in FIG. 4B. For example, the standardized attributes may include a national bundle offer (e.g., for bundled services, such as cable, telephone, and Internet) provided by the backend, a profitability indicator provided by the backend, a broadband service (HSI) USOC exclusion provided by the backend, and a broadband service USOC exclusion provided by the frontend. Operations 400 may further include standardizing other attributes which are not available in databases 140/150 (block 445). For example, a loop qualification service may be utilized to standardize other attributes which are not available in databases 140/150. The standardized attributes and the standardized unavailable attributes may include the information provided in block 450, as shown in FIG. 4B. For example, the standardized attributes and the standardized unavailable attributes may include the information provided in block 440 as well as a loop qualification indicator provided by the frontend. Operations 400 may then create a final list of standardized attributes for qualification purposes (block 455). The final list of standardized attributes may correspond to offer qualification indicators 340 described above in connection with FIG. 3.

Figure 4C:
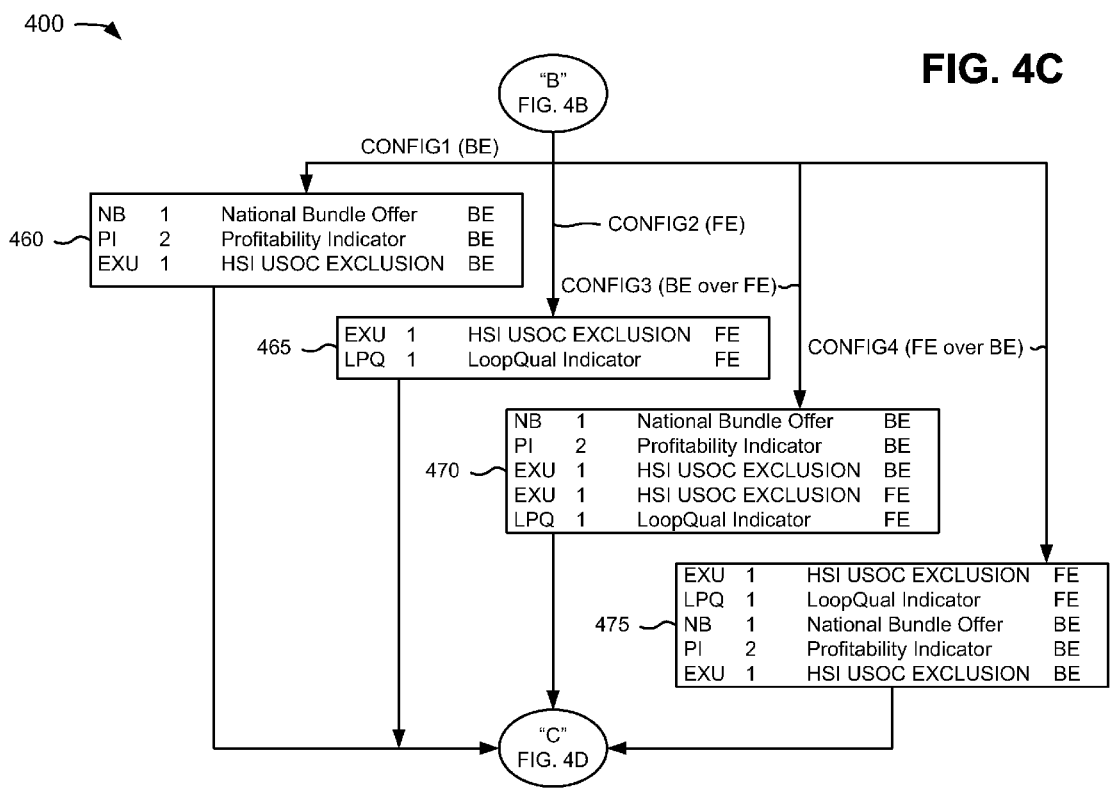

As shown in FIG. 4C, operations 400 may include providing multiple configurations for offer qualification indicators 340. For example, a first configuration may include only offer qualification indicators 340 obtained from the backend (block 460). A second configuration may include only offer qualification indicators 340 obtained from the frontend (block 465). A third configuration (e.g., a BE over FE configuration) may include offer qualification indicators 340 (e.g., obtained from the backend) listed before offer qualification indicators 340 (e.g., obtained from the frontend) (block 470). A forth configuration (e.g., a FE over BE configuration) may include offer qualification indicators 340 (e.g., obtained from the frontend) listed before offer qualification indicators 340 (e.g., obtained from the backend) (block 475).

Figure 4D:
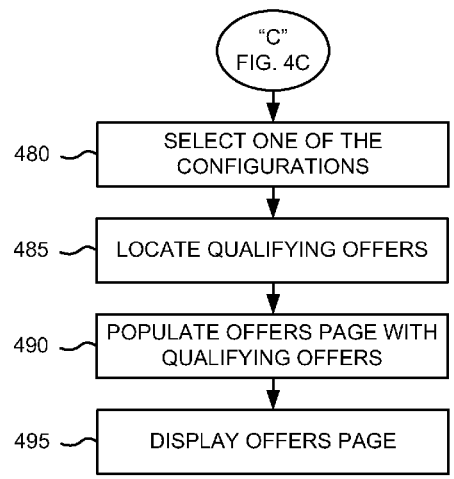

As shown in FIG. 4D, operations 400 may include selecting one of the configurations (block 480). For example, in implementations described above in connection with FIG. 3, the frontend may select one of the configurations, and may provide the selected configuration (e.g., as modified offer quality indicators 345) to databases 140/150. Databases 140/150 may provide modified offer qualification indicators 345 to application server 120, and application server 120 may receive modified offer qualification indicators 345.

As further shown in FIG. 4D, operations 400 may include locating qualifying offers (e.g., from the selected configuration) (block 485), populating an offers page with the qualifying offers (block 490), and displaying the offers page to the representative (block 495). For example, in implementations described above in connection with FIG. 3, application server 120 may perform a qualification of the offers provided in modified offer qualification indicators 345, and may determine qualified offers 350 based on the qualification. Qualified offers 350 may include offers (e.g., for a product or service) for which the particular customer qualifies. Application server 120 may provide qualified offers 350 to user device 110, and user device 110 may display qualified offers 350 to the user (e.g., the customer service representative).

Although FIGS. 4A-4D show exemplary operations 400 capable of being performed by network 100, in other implementations, network 100 may perform fewer operations, different operations, or additional operations than depicted in FIGS. 4A-4D.

Figure 5:
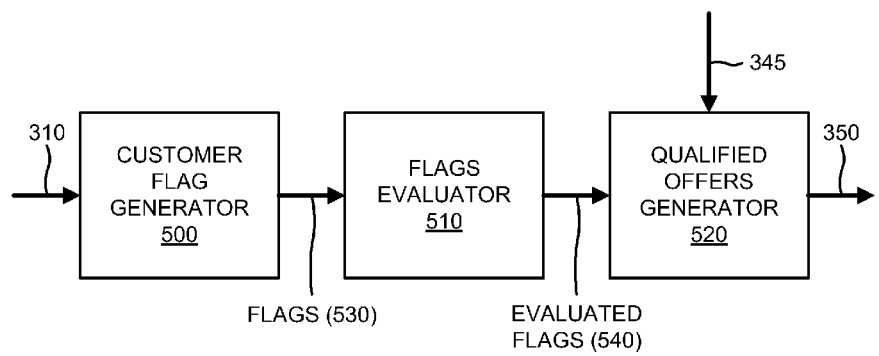
FIG. 5 is a diagram of exemplary functional components of an application server depicted in FIG. 1.

FIG. 5 is a diagram of exemplary functional components of application server 120. In one example, the functional components described in connection with FIG. 5 may be implemented by one or more of the components depicted in FIG. 2. As shown, application server 120 may include a customer flag generator 500, a flags evaluator 510, and a qualified offers generator 520.

Customer flag generator 500 may include hardware or a combination of hardware and software that may receive profile information 310 from external sources 130, and may associate the customer with flags 530 in real time and based on profile information 310. Flags 530 may include information indicating which products and/or services that the customer currently does not possess and/or subscribe to. Customer flag generator 500 may provide flags 530 to flags evaluator 510.

Flags evaluator 510 may include hardware or a combination of hardware and software that may receive flags 530 from customer flag generator 500, and may evaluate flags 530 in real time to produce evaluated flags 540. For example, flags evaluator 510 may determine whether the products and/or services provided by flags 530 may be bought by and/or subscribed to by the customer, whether the products and/or services provided by flags 530 are available to the customer, etc. If one of flags 530 is unavailable to the customer (e.g., for any reason), flags evaluator 510 may mark the particular flag 530 as unavailable. Flags evaluator 510 may provide evaluated flags 540 to qualified offers generator 520.

Qualified offers generator 520 may include hardware or a combination of hardware and software that may receive evaluated flags 540 from flags evaluator 510 and may receive modified offer qualification indicators 345 from databases 140/150. Qualified offers generator 520 may qualify offers (e.g., provided by modified offer qualification indicators 345), based on evaluated flags 540, in order to generate qualified offers 350. Qualified offers generator 520 may provide qualified offers 350 to user device 110, and user device 110 may display qualified offers 350 to the user (e.g., the customer service representative).

Although FIG. 5 shows exemplary functional components of application server 120, in other implementations, application server 120 may contain fewer functional components, different functional components, differently arranged functional components, or additional functional components than depicted in FIG. 5. Alternatively, or additionally, one or more functional components of application server 120 may perform one or more other tasks described as being performed by one or more other functional components of application server 120.

Figure 6:
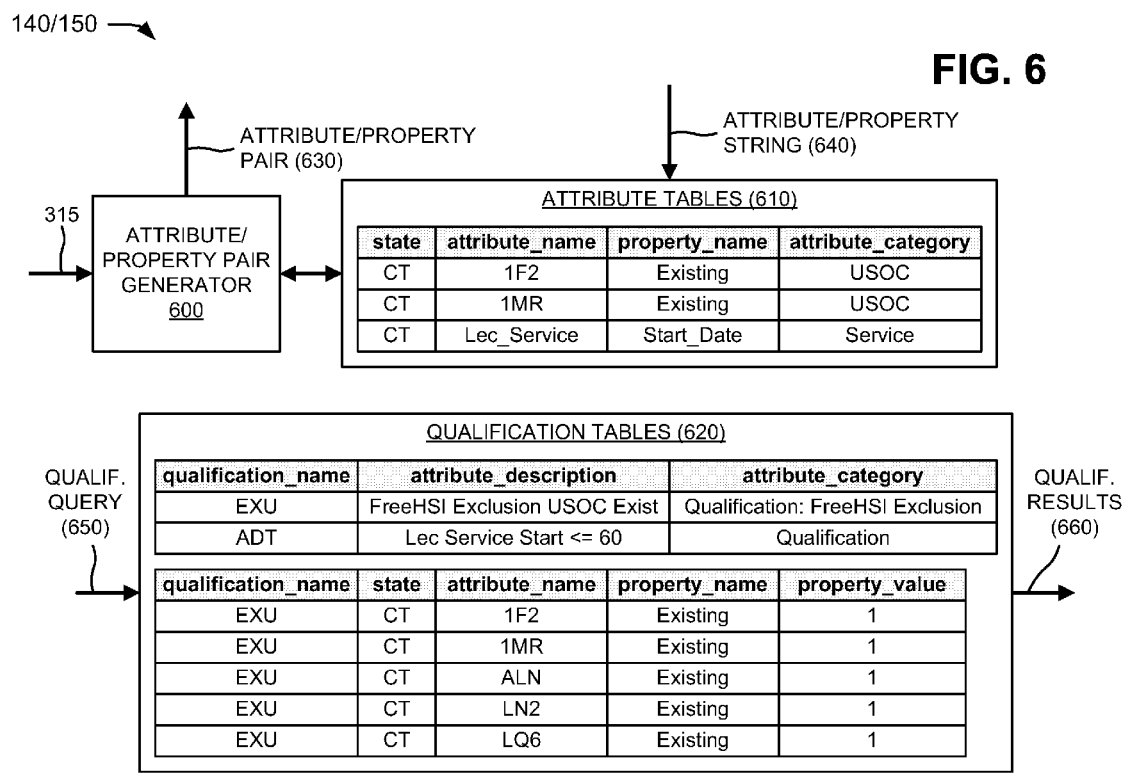
FIG. 6 is a diagram of exemplary functional components of a data warehouse and/or an internal source depicted in FIG. 1.

FIG. 6 is a diagram of exemplary functional components of data warehouse 140 and/or internal source 150 (i.e., databases 140/150). In one example, the functional components described in connection with FIG. 6 may be implemented by one or more of the components depicted in FIG. 2. As shown, databases 140/150 may include an attribute/property pair generator 600, attribute tables 610, and qualification tables 620.

Attribute/property pair generator 600 may include hardware or a combination of hardware and software that may receive database call 315 from application server 120, and may generate an attribute/property pair 630 (e.g., via interaction with attribute tables 610) based on database call 315. Attribute/property pair 630 may be used to describe attributes and/or properties that the frontend may need to search (e.g., for offers) and may include a format of "(Attribute, Property)." For example, attribute tables 610 may provide three attribute/property pairs 630 (i.e., (1F2, Existing), (1MR, Existing), and (Lec_Service, Start_Date)) for the state of Connecticut (Conn.).

Attribute tables 610 may include a variety of information associated with customers, attributes, properties, etc. For example, attribute tables 610 may include a state field, an attribute name field, a property name field, an attribute category field, and/or a variety of entries associated with the fields. The state field may provide a name of state associated with a customer. The attribute name field may provide one or more attributes (e.g., products and/or services) available to the customer in the state identified by the state field. The property name field may provide properties (e.g., existing, start date, etc.) associated with the attributes provided in the attribute name field. The attribute category field may provide categories (e.g., USOC, a service, etc.) associated with the attributes provided in the attribute name field. Although FIG. 6 shows exemplary information that may be provided in attribute tables 610, in other implementations, attribute tables 610 may contain less information, different information, or additional information than depicted in FIG. 6.

The frontend may receive attribute/property pair 630 from databases 140/150, may check external services (e.g., web services) based on attribute/property pair 630, and may generate an attribute/property string 640. As shown in FIG. 6, the frontend may provide attribute/property string 640 to attribute tables 610. For example, if "1F2" exists for a Connecticut telephone number and its LEC service start date is "2009-02-01," then the frontend may return a value of "1" (e.g., for 1F2 existing) and a value of "2009-02-01" (e.g., for LEC service start date) in an attribute/property string 640, such as "1F2~USOC~Existing~1|lec_service~service~Start_Date~2009-02-01."

Qualification tables 620 may include a variety of information associated with customers, attributes, properties, qualification rules, etc. For example, qualification tables 620 may include a first table that includes a qualification name field, an attribute description field, an attribute category field, and/or a variety of entries associated with the fields. The qualification name field may provide one or more qualification rules (e.g., exclusion (EXU)) associated with an attribute. The attribute description field may provide descriptions (e.g., free exclusion, LEC start date, etc.) associated with the qualification rules provided in the qualification name field. The attribute category field may provide categories (e.g., free exclusion, qualification, etc.) associated with the qualification rules provided in the qualification name field.

Qualification tables 620 may include a second table that includes a qualification name field, a state field, an attribute name field, a property name field, a property value field, and/or a variety of entries associated with the fields. The qualification name field may provide one or more qualification rules (e.g., exclusion (EXU)) associated with an attribute. The state field may provide a name of state associated with a customer. The attribute name field may provide one or more attributes (e.g., products and/or services) available to the customer in the state identified by the state field. The property name field may provide properties (e.g., existing, start date, etc.) associated with the attributes provided in the attribute name field. The property value field may provide a value (e.g., "1") associated with the properties provided in the property name field. In one example and with reference to the first entry of the second table of qualification tables 620, if the state is "CT," the attribute name is "1F2," the property name is "Existing," and the property value is "1," then the rule "EXU" may be qualified. Although FIG. 6 shows exemplary information that may be provided in qualification tables 620, in other implementations, qualification tables 620 may contain less information, different information, or additional information than depicted in FIG. 6.

As further shown in FIG. 6, the frontend may provide a qualification query 650 to databases 140/150. Qualification query 650 may include a request for a determination of whether an attribute(s) is qualified. Databases 140/150 may execute qualification query 650 (e.g., on qualification tables 620) to determine qualification results 660 (e.g., a list of qualified attributes), and may provide qualification results 660 to the frontend.

Although FIG. 6 shows exemplary functional components of databases 140/150, in other implementations, databases 140/150 may contain fewer functional components, different functional components, differently arranged functional components, or additional functional components than depicted in FIG. 6. Alternatively, or additionally, one or more functional components of databases 140/150 may perform one or more other tasks described as being performed by one or more other functional components of databases 140/150.

Figure 7:
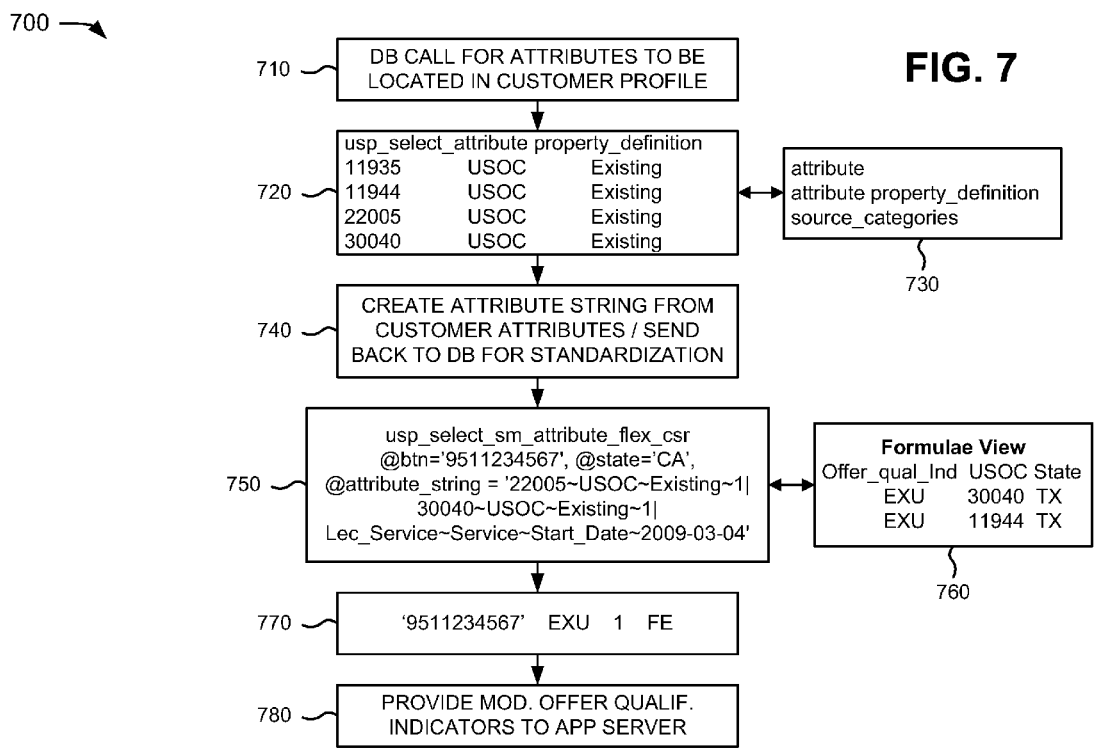
FIG. 7 is another diagram of exemplary operations capable of being performed by one or more of the devices of the network depicted in FIG. 1.

FIG. 7 is another diagram of exemplary operations 700 capable of being performed by one or more devices of network 100 (FIG. 1). In one example, one or more of operations 700 may correspond to one or more of the operations described above in connection with FIG. 3.

As shown in FIG. 7, exemplary operations 700 may include receiving a database call requesting attributes to be located in a customer's profile (block 710). For example, in implementations described above in connection with FIG. 3, application server 120 (e.g., based on profile information 310) may provide database call 315 to databases 140/150. Database call 315 may include a request for information associated with offers (e.g., for products and/or services) that may be applicable to the customer based on profile information 310. Databases 140/150 may receive database call 315 and may generate standard attribute list 320 based on database call 315. Standard attribute list 320 may include offer eligibility conditions (e.g., conditions defining for which offers the customer may be eligible) associated with the particular customer. Databases 140/150 may provide standard attribute list 320 to the frontend (e.g., to external sources 130) in order to retrieve attribute values 325 from the frontend (FE). Attribute values 325 may include information that databases 140/150 may need for standard attribute list 320.

In one implementation, the database call may include a search string (e.g., "usp_select_attribute_property_definition") (block 720) that is used to retrieve attributes (block 720) associated with the customer. For example, as shown in FIG. 7, the attributes associated with the customer may include USOCs (e.g., "11935," "11944," "22005," and "30040") that define various network components, interfaces, products, and/or services associated with the customer, and information indicating a status (e.g., "Existing") of the USOCs. The attributes associated with the customer (block 720) may correspond to attribute values 325 described above in connection with FIG. 3. As further shown in FIG. 7, the attributes associated with the customer (block 720) may be retrieved from fields of tables (e.g., attribute tables 610 and/or qualification tables 620 described above in connection with FIG. 6) provided in databases 140/150 (block 730).

Operations 700 may also include creating an attribute string from the customer attributes and sending the attribute string back to databases 140/150 for standardization (block 740). For example, in implementations described above in connection with FIG. 3, the frontend may receive standard attribute list 320 and may create an attribute string with customer values for the standard attributes provided in list 320. The frontend may provide the attribute string (e.g., with the customer values) to databases 140/150 as FE values 330. Databases 140/150 may use standard attribute list 320 (e.g., and/or FE values 330) to search (e.g., tables provided in databases 140/150) for customer values for the standard attributes provided in list 320. Databases 140/150 may retrieve such customer values as backend (BE) values 335.

Databases 140/150 may standardize the attributes based on a text string (block 750). As shown in FIG. 7, the text string may include information associated with the customer's telephone number (e.g., "9511234567"), the customer's state (e.g., "CA"), USOC information, the customer's start date for a LEC service, etc. In one implementation, the attributes may be standardized based on interaction with tables (e.g., attribute tables 610 and/or qualification tables 620 described above in connection with FIG. 6) provided in databases 140/150 (block 760).

The standardized attributes (e.g., as standardized by databases 140/150 based on the text string) may include the information provided in block 770, as shown in FIG. 7. For example, the standardized attributes may include a telephone number (e.g., "9511234567") associated with the customer, an exclusion (EXU), etc. (e.g., provided by the frontend). The standardized attributes (e.g., provided in block 770) may correspond to modified offer qualification indicators 345 described above in connection with FIG. 3. As further shown in FIG. 7, operations 700 may include providing modified offer qualification indicators 345 to application server (block 780).

Although FIG. 7 shows exemplary operations 700 capable of being performed by network 100, in other implementations, network 100 may perform fewer operations, different operations, or additional operations than depicted in FIG. 7.

Figure 8:
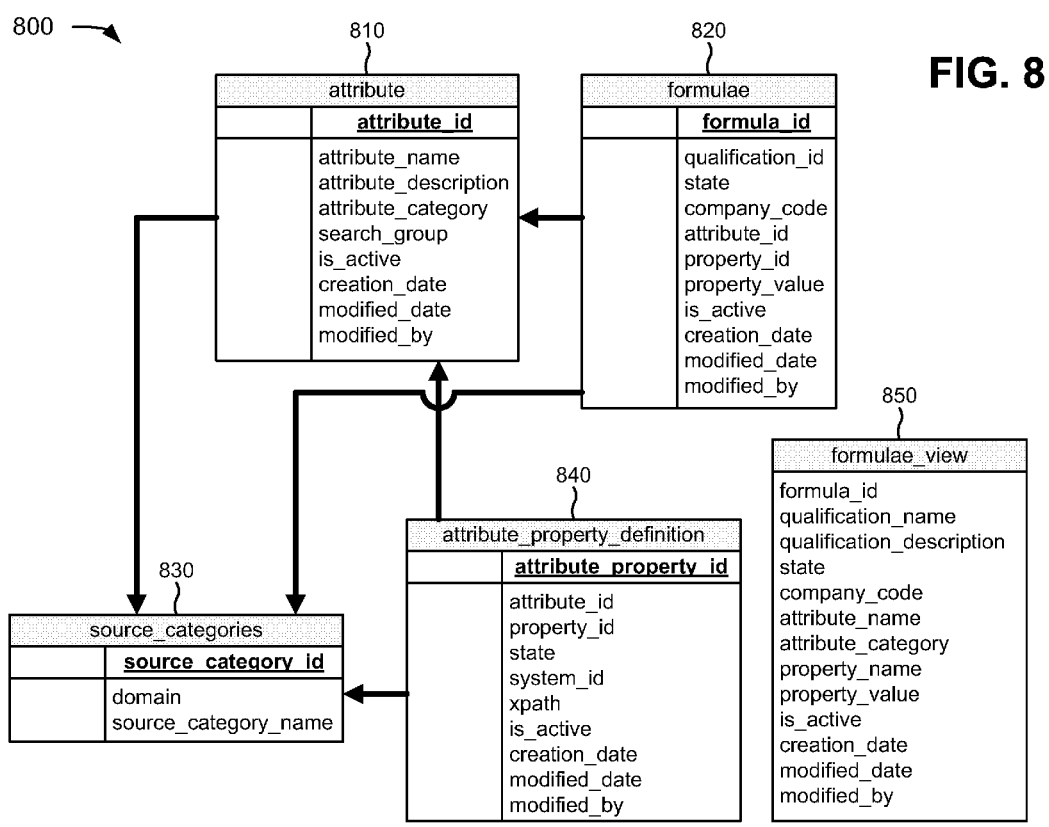
FIG. 8 is a diagram of exemplary data structures capable of being stored in the data warehouse and/or the internal source depicted in FIG. 1.

FIG. 8 is a diagram of exemplary data structures 800 capable of being stored in data warehouse 140 and/or internal source 150 (i.e., databases 140/150). As shown, data structures 800 may include an attribute data structure 810, a formulae data structure 820, a source categories data structure 830, an attribute property definition data structure 840, and a formulae view data structure 850.

Attribute data structure 810 may include a table of identifiers associated with attributes (e.g., products and/or services) that may be offered to one or more customers. For example, as shown in FIG. 8, attribute data structure 810 may include an attribute name identifier (e.g., providing a name of an attribute); an attribute description identifier (e.g., providing a description of an attribute); an attribute category identifier (e.g., providing a category of an attribute); a search group identifier (e.g., providing a search group for an attribute); an is active identifier (e.g., providing an indication of whether an attribute is active); a creation date identifier (e.g., providing a creation date of an attribute); a modified date identifier (e.g., providing a date (if any) of when an attribute is modified); and a modified by identifier (e.g., providing an indication of who/what modified an attribute).

Formulae data structure 820 may include a table of identifiers associated with formulas (e.g., formulas for generating an attribute string). For example, as shown in FIG. 8, formulae data structure 820 may include a qualification identifier (e.g., providing a qualification factor for a formula); a state identifier (e.g., providing a geographic state associated with a formula); a company code identifier (e.g., providing a company code for a formula); an attribute identifier (e.g., providing an identification of an attribute for a formula); a property identifier (e.g., providing an identification of a property for a formula); a property value identifier (e.g., providing a property value for a formula); an is active identifier (e.g., providing an indication of whether a formula is active); a creation date identifier (e.g., providing a creation date of a formula); a modified date identifier (e.g., providing a date (if any) of when a formula is modified); and a modified by identifier (e.g., providing an indication of who/what modified a formula).

Source categories data structure 830 may include a table of identifiers associated with source categories (e.g., categories of sources providing attributes). For example, as shown in FIG. 8, source categories data structure 830 may include a domain identifier (e.g., identifying a domain of a source category) and a source category name identifier (e.g., identifying a name of a source category).

Attribute property definition data structure 840 may include a table of identifiers associated with attributes and/or properties (e.g., attribute/property pair 630 (FIG. 6)). For example, as shown in FIG. 8, attribute property definition data structure 840 may include an attribute identifier (e.g., providing an identification of an attribute for an attribute/property pair); a property identifier (e.g., providing an identification of a property for an attribute/property pair); a state identifier (e.g., providing a geographic state associated with an attribute/property pair); a system identifier (e.g., providing an identification of a system associated with an attribute/property pair); an xpath identifier (e.g., providing an identification of an xpath associated with an attribute/property pair); an is active identifier (e.g., providing an indication of whether an attribute/property pair is active); a creation date identifier (e.g., providing a creation date of an attribute/property pair); a modified date identifier (e.g., providing a date (if any) of when an attribute/property pair is modified); and a modified by identifier (e.g., providing an indication of who/what modified an attribute/property pair).

Formulae view data structure 850 may include a table of identifiers provided in other data structures (e.g., in data structures 810-840). For example, as shown in FIG. 8, formulae view data structure 850 may include a formula identifier, a qualification name identifier, a qualification description identifier, a state identifier, a company code identifier, an attribute name identifier, an attribute category identifier, a property name identifier, a property value identifier, an is active identifier, a creation date identifier, a modified date identifier, and a modified by identifier.

Although FIG. 8 shows exemplary information that may be provided in databases 140/150, in other implementations, databases 140/150 may contain less information, different information, or additional information than depicted in FIG. 8.

Figure 9:
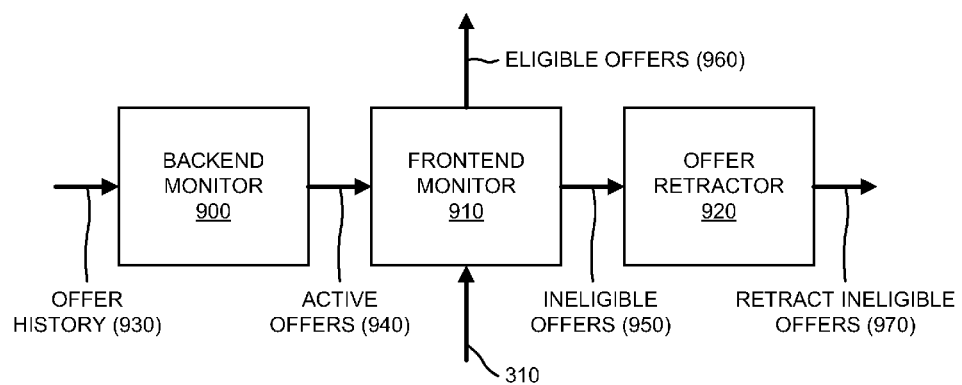
FIG. 9 is a diagram of additional exemplary functional components of the application server depicted in FIG. 1.

FIG. 9 is a diagram of additional exemplary functional components of application server 120. In one example, the functional components described in connection with FIG. 9 may be implemented by one or more of the components depicted in FIG. 2. As shown, application server 120 may include a backend monitor 900, a frontend monitor 910, and an offer retractor 920.

Backend monitor 900 may include hardware or a combination of hardware and software that may receive offer history 930 from databases 140/150. Offer history 930 may include a list of all offers (e.g., for products and/or services) provided to a particular customer. Backend monitor 900 may determine (e.g., periodically) which offers (e.g., provided in offer history 930) are still active and for which the customer still qualifies (e.g., active offers 940), and may provide active offers 940 to frontend monitor 910.

Frontend monitor 910 may include hardware or a combination of hardware and software that may receive active offers 940 from backend monitor 900 and may receive profile information 310 from external sources 130. Based on profile information 310 (e.g., associated with the customer), frontend monitor 910 may determine (e.g., periodically) for which of active offers 940 that the customer is ineligible (e.g., ineligible offers 950) and for which of active offers 940 that the customer is eligible (e.g., eligible offers 960). For example, if a customer fails to qualify for a particular offer more than a particular number of times, frontend monitor 910 may determine that the customer is ineligible for the particular offer. Frontend monitor 910 may provide ineligible offers 950 to offer retractor 920, and may provide eligible offers 960 to user device 110.

Offer retractor 920 may include hardware or a combination of hardware and software that may receive ineligible offers 950 from frontend monitor 910, and may retract ineligible offers 950, as indicated by reference number 970. For example, offer retractor 920 may retract a particular offer from qualified offers 350 (FIG. 3) so that the particular offer is not displayed to a customer service representative (e.g., via user device 110).

Although FIG. 9 shows exemplary functional components of application server 120, in other implementations, application server 120 may contain fewer functional components, different functional components, differently arranged functional components, or additional functional components than depicted in FIG. 9. Alternatively, or additionally, one or more functional components of application server 120 may perform one or more other tasks described as being performed by one or more other functional components of application server 120.

Figure 10:
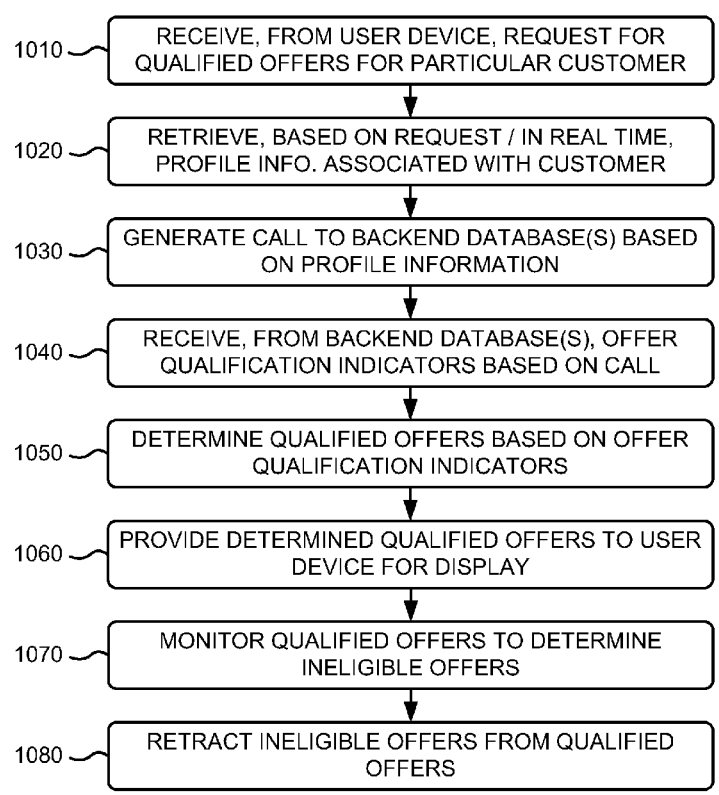
FIG. 10 is a flow chart of an exemplary process for providing integrated qualification and monitoring for customer promotions according to implementations described herein.

FIG. 10 is a flow chart of an exemplary process 1000 for providing integrated qualification and monitoring for customer promotions according to implementations described herein. In one implementation, process 1000 may be performed by application server 120. In another implementation, some or all of process 1000 may be performed by another device or group of devices, including or excluding application server 120.

As illustrated in FIG. 10, process 1000 may include receiving, from a user device, a request for qualified offers for a particular customer (block 1010), and retrieving, based on the request and in real time, profile information associated with the customer (block 1020). For example, in implementations described above in connection with FIG. 3, a user (e.g., a customer service representative) may provide request 305 to user device 110. Request 305 may include a request for qualified offers (e.g., for products and/or services) for a particular customer. User device 110 may provide request 305 to application server 120, and application server 120 may receive request 305. Application server 120 (e.g., based on request 305) may retrieve profile information 310 (e.g., from external sources 130) associated with the customer identified by request 305. Profile information 310 may include a variety of information associated with the customer, such as demographic information associated with the customer, current products owned by the customer, current services subscribed to by the customer, etc.

As further shown in FIG. 10, process 1000 may include generating a call to a backend database(s) based on the profile information (block 1030), and receiving, from the backend database(s), offer qualification indicators based on the call (block 1040). For example, in implementations described above in connection with FIG. 3, application server 120 (e.g., based on profile information 310) may invoke database call 315 to databases 140/150. Database call 315 may include a request for information associated with offers (e.g., for products and/or services) that may be applicable to the customer based on profile information 310. Databases 140/150 may receive database call 315 and may generate standard attribute list 320 based on database call 315. Databases 140/150 may provide standard attribute list 320 to the frontend (e.g., to external sources 130) in order to retrieve attribute values 325 from the frontend (FE). Databases 140/150 may prepare offer qualification indicators 340 based on FE values 330 and BE values 335. Databases 140/150 may provide offer qualification indicators 340 to the frontend (e.g., to external sources 130). The frontend may provide multiple configurations for offer qualification indicators 340. The frontend may select one of the configurations, and may provide the selected configuration (e.g., as modified offer quality indicators 345) to databases 140/150. Databases 140/150 may provide modified offer qualification indicators 345 to application server 120, and application server 120 may receive modified offer qualification indicators 345.

Returning to FIG. 10, process 1000 may include determining qualified offers based on the offer qualification indicators (block 1050), and providing the determined qualified offers the user device for display (block 1060). For example, in implementations described above in connection with FIG. 3, application server 120 may perform a qualification of the offers provided in modified offer qualification indicators 345, and may determine qualified offers 350 based on the qualification. Qualified offers 350 may include offers (e.g., for products and/or services) for which the particular customer qualifies. Application server 120 may provide qualified offers 350 to user device 110, and user device 110 may display qualified offers 350 to the user (e.g., the customer service representative).

As further shown in FIG. 10, process 1000 may include monitoring the qualified offers to determine ineligible offers (block 1070), and retracting the ineligible offers from the qualified offers (block 1080). For example, in implementations described above in connection with FIG. 9, backend monitor 900 of application server 120 may receive offer history 930 from databases 140/150. Backend monitor 900 may determine which offers (e.g., provided in offer history 930) are still active and for which the customer still qualifies (e.g., active offers 940), and may provide active offers 940 to frontend monitor 910. Frontend monitor 910 may receive active offers 940 from backend monitor 900 and may receive profile information 310 from external sources 130. Based on profile information 310 (e.g., associated with the customer), frontend monitor 910 may determine for which of active offers 940 that the customer is ineligible (e.g., ineligible offers 950) and for which of active offers 940 that the customer is eligible (e.g., eligible offers 960). Frontend monitor 910 may provide ineligible offers 950 to offer retractor 920, and may provide eligible offers 960 to user device 110. Offer retractor 920 may receive ineligible offers 950 from frontend monitor 910, and may retract ineligible offers 950, as indicated by reference number 970. In one example, offer retractor 920 may retract a particular offer from qualified offers 350 (FIG. 3) so that the particular offer is not displayed to a customer service representative (e.g., via user device 110).

Figure 11:
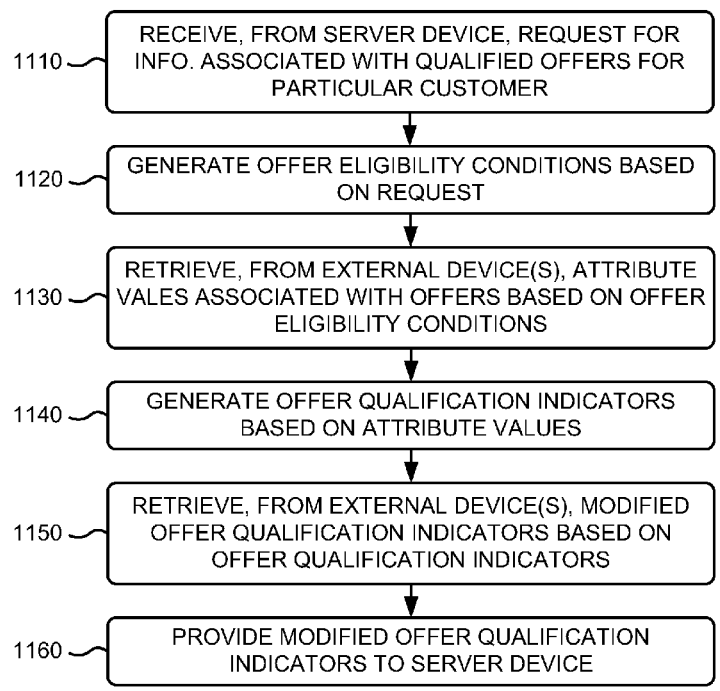
FIG. 11 is a flow chart of an exemplary process for generating customer offer qualification indicators according to implementations described herein.

FIG. 11 is a flow chart of an exemplary process 1100 for generating customer offer qualification indicators according to implementations described herein. In one implementation, process 1100 may be performed by databases 140/150. In another implementation, some or all of process 1100 may be performed by another device or group of devices, including or excluding databases 140/150.

As illustrated in FIG. 11, process 1100 may include receiving, from a server device, a request for information associated with qualified offers for a particular customer (block 1110), and generating offer eligibility conditions based on the request (block 1120). For example, in implementations described above in connection with FIG. 3, application server 120 (e.g., based on profile information 310) may invoke database call 315 to databases 140/150. Database call 315 may include a request for information associated with offers (e.g., for products and/or services) that may be applicable to the customer based on profile information 310. Databases 140/150 may receive database call 315 and may generate standard attribute list 320 based on database call 315. Standard attribute list 320 may include offer eligibility conditions (e.g., conditions defining for which offers the customer may be eligible) associated with the particular customer.

As further shown in FIG. 11, process 1100 may include retrieving, from an external device(s), attribute values associated with offers based on the offer eligibility conditions (block 1130), and generating offer qualification indicators based on the attribute values (block 1140). For example, in implementations described above in connection with FIG. 3, databases 140/150 may provide standard attribute list 320 to the frontend (e.g., to external sources 130) in order to retrieve attribute values 325 from the frontend (FE). Attribute values 325 may include information that databases 140/150 may need for standard attribute list 320. The frontend may provide the attribute string (e.g., with the customer values) to databases 140/150 as FE values 330. Databases 140/150 may use standard attribute list 320 (e.g., and/or FE values 330) to search (e.g., tables provided in databases 140/150) for customer values for the standard attributes provided in list 320. Databases 140/150 may retrieve such customer values as backend (BE) values 335. Databases 140/150 may prepare offer qualification indicators 340 based on FE values 330 and BE values 335. Offer qualification indicators 340 may include indicators of offers (e.g., a broadband service, a national bundle offer, etc.) for which the customer may qualify, flags indicating whether the offer information was obtained from the frontend or the backend, etc.

Returning to FIG. 11, process 1100 may include retrieving, from the external device(s), modified offer qualification indicators based on the offer qualification indicators (block 1150), and providing the modified offer qualification indicators to the server device (block 1160). For example, in implementations described above in connection with FIG. 3, databases 140/150 may provide offer qualification indicators 340 to the frontend (e.g., to external sources 130). The frontend may receive offer qualification indicators 340, may call on other external services (e.g., if required), and may retrieve additional information for offer qualification indicators 340. The frontend may provide multiple configurations for offer qualification indicators 340. The frontend may select one of the configurations, and may provide the selected configuration (e.g., as modified offer quality indicators 345) to databases 140/150. In one example, modified offer quality indicators 345 may be presented as a matrix that includes offers for the particular customer and scores associated with the offers. Databases 140/150 may provide modified offer qualification indicators 345 to application server 120.

Systems and/or methods described herein may provide integrated qualification and monitoring for customer promotions. The systems and/or methods may determine whether a customer is qualified for promotions (e.g., offers for products and/or services) based on qualification criteria information retrieved from customer profile information (e.g., retrieved from frontend devices in real time) and/or retrieved from backend devices. The systems and/or methods may strengthen and/or supplement an offer qualification process, may distribute load associated with the offer qualification process, may require a minimum amount of code changes, and/or may be applied to various types of qualification projects.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 10 and 11, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the description of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, the method comprising:
   receiving, by the computing device and from a server device, a request for information associated with qualified offers for a particular customer;
   generating, by the computing device, offer eligibility conditions, the offer eligibility conditions identifying one or more attributes associated with a plurality of offers,
   the offer eligibility conditions being identified based on the request, and
   the one or more attributes identifying at least one of a product or a service associated with the particular customer;
   retrieving, by the computing device and from an external device, first attribute values for the one or more attributes identified by the offer eligibility conditions;
   identifying, by the computing device, customer attribute values corresponding to the first attribute values, the customer attribute values being identified based on profile information associated with the particular customer;
generating, by the computing device, offer qualification indicators based on the first attribute values and the customer attribute values, the offer qualification indicators identifying the qualified offers, from the plurality of offers, for the particular customer;
providing, by the computing device, the offer qualification indicators to the external device;
retrieving, by the computing device and from the external device, modified offer qualification indicators based on the offer qualification indicators, the modified offer qualification indicators including additional information associated with the qualified offers the additional information being selected based on the offer qualification indicators; and
providing, by the computing device, the modified offer qualification indicators to the server device, the server device determining one or more offers, of the qualified offers, for the particular customer based on the modified offer qualification indicators and periodically monitoring the one or more offers to determine whether the particular customer is eligible for the one or more offers.

2. The computing device-implemented method of claim 1, where the computing device comprises a database server device.

3. The computing device-implemented method of claim 1, further comprising:
identifying, based on the request, information associated with offers that are applicable to the particular customer based on profile information associated with the particular customer.

4. The computing device-implemented method of claim 1, where the offer eligibility conditions comprise conditions used to determine an eligibility of the particular customer for each offer, of the plurality of offers.

5. The computing device-implemented method of claim 1, where the modified offer qualification indicators comprise:
one or more indicators that identify the qualified offers
one or more flags indicating whether offer information, associated with the modified offer qualification indicators, was obtained from the external device.

6. The computing device-implemented method of claim 1, where the modified offer qualification indicators comprise a matrix that includes:
information identifying the qualified offers, for the particular customer, and
scores associated with the particular customer for each offer of the qualified offers.

7. A device comprising:
a memory to store a plurality of instructions; and
a processor to execute instructions in the memory to:
receive, from an application server device, a request for information associated with qualified offers for a particular customer,
generate offer eligibility conditions, the offer eligibility conditions being associated with a plurality of offers that are identified based on the request,
retrieve, from an external device, first attribute values for the offer eligibility conditions, the first attribute values defining attributes associated with the plurality of offers,
determine customer attribute values based on the first attribute values and profile information associated with the particular customer,
generate offer qualification indicators based on the first attribute values and the customer attribute values, the offer qualification indicators identifying the qualified offers, from the plurality of offers, for the particular customer,
provide the offer qualification indicators to the external device,
receive, from the external device, modified offer qualification indicators based on the offer qualification indicators, the modified offer qualification indicators including additional information retrieved by the external device from one or more other external devices, the additional information being associated with one or more offers, of the qualified offers, and
provide the modified offer qualification indicators to the server device, the server device determining a group of offers, of the qualified offers, for the particular customer based on the modified offer qualification indicators and periodically monitoring the qualified offers to determine whether the particular customer remains eligible for the qualified offers.

8. The device of claim 7, where, when receiving the request for information, the processor executes instructions in the memory further to:
receive the request for information, the request requesting information associated with offers that are applicable to the particular customer based on the profile information associated with the particular customer.

9. The device of claim 7, where, when generating the offer qualification indicators, the processor is to execute instructions in the memory further to one or more of:
generate indicators of offers for which the particular customer qualifies, or
generate flags indicating whether offer information was obtained from a frontend device or a backend device,
where, the processor further generates the offer qualification indicators based on the generated indicators of offers or the generated flags.

10. A system comprising:
one or more devices to:
receive a request for information for identifying one or more offers to be presented to a particular customer,
generate a first attribute list based on the request, the first attribute list identifying one or more attributes associated with the particular customer,
transmit the first attribute list to a frontend device,
receive first attribute values from the frontend device in response to transmitting the first attribute list,
determine second attribute values associated with the particular customer based on the first attribute values,
generate offer qualification indicators based on the first attribute values and the second attribute values, the offer qualification indicators identifying a group of offers, of the plurality of offers, for the particular customer;
transmit the offer qualification indicators to the frontend device,
receive the information for identifying the qualified offers from the front end device, the information for identifying the qualified offers including the offer qualification indicators and additional offer qualification indicators obtained by the front end device, and
transmit the information for identifying the qualified offers to server device that transmitted the request to the one or more devices.

11. The system of claim 10, where, when generating the first attribute list, the one or more devices are to:
generate a search string based on information included in the request, identify, based on the search string, data that:
    defines a network component or an interface associated with the particular customer, and
    indicates a status of the network component or the interface with respect to the customer,
generate the first attribute list further based on the identified data.

12. The system of claim 10, where, when transmitting the offer qualification indicators to the front end device, the one or more devices are to:
    transmit a plurality of configurations of the offer qualification indicators to the front end device, and
    where, when receiving the information for identifying the qualified offers from the front end device, the one or more devices are to:
        receive a selected configuration, of the plurality of configurations of the offer qualification indicators, the selected configuration included in the information for identifying the qualified offers.

13. The system of claim 10, where, when generating the offer qualification indicators, the one or more devices are to:
    generate indicators of offers for which the particular customer qualifies, and
    generate flags indicating whether offer information was obtained from the frontend device.

14. The system of claim 10, where the information for identifying the offers further includes:
    information identifying the qualified offers, and
    scores associated with the particular customer for each offer, of the qualified offers.

15. The system of claim 10, where, when generating the first attribute list, the one or more devices are to:
    identify one or more universal service order codes associated with the particular customer, where the one or more universal service order codes identify one or more of a product or a service associated with the particular customer, and
    generate the first attribute list further based on the identified one or more universal service order codes.

16. The system of claim 15, where, when generating the first attribute list, the one or more devices are further to:
    generate a text string based on profile information associated with the particular customer,
    standardize the one or more attributes based on the search string and the identified one or more universal service order codes, and
    generate the first attribute list further based on the standardized one or more attributes.

* * * * *